Patented Sept. 10, 1946

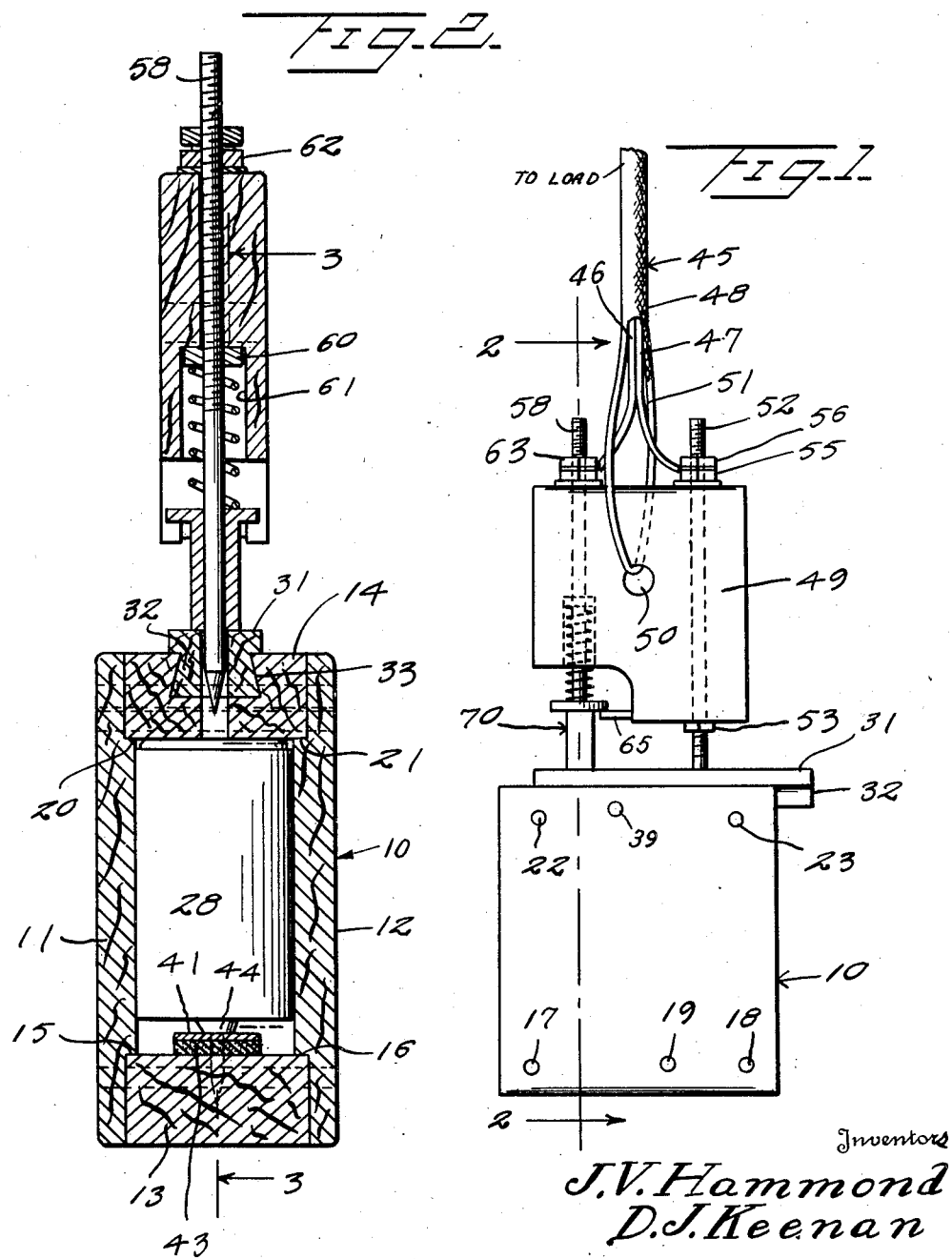

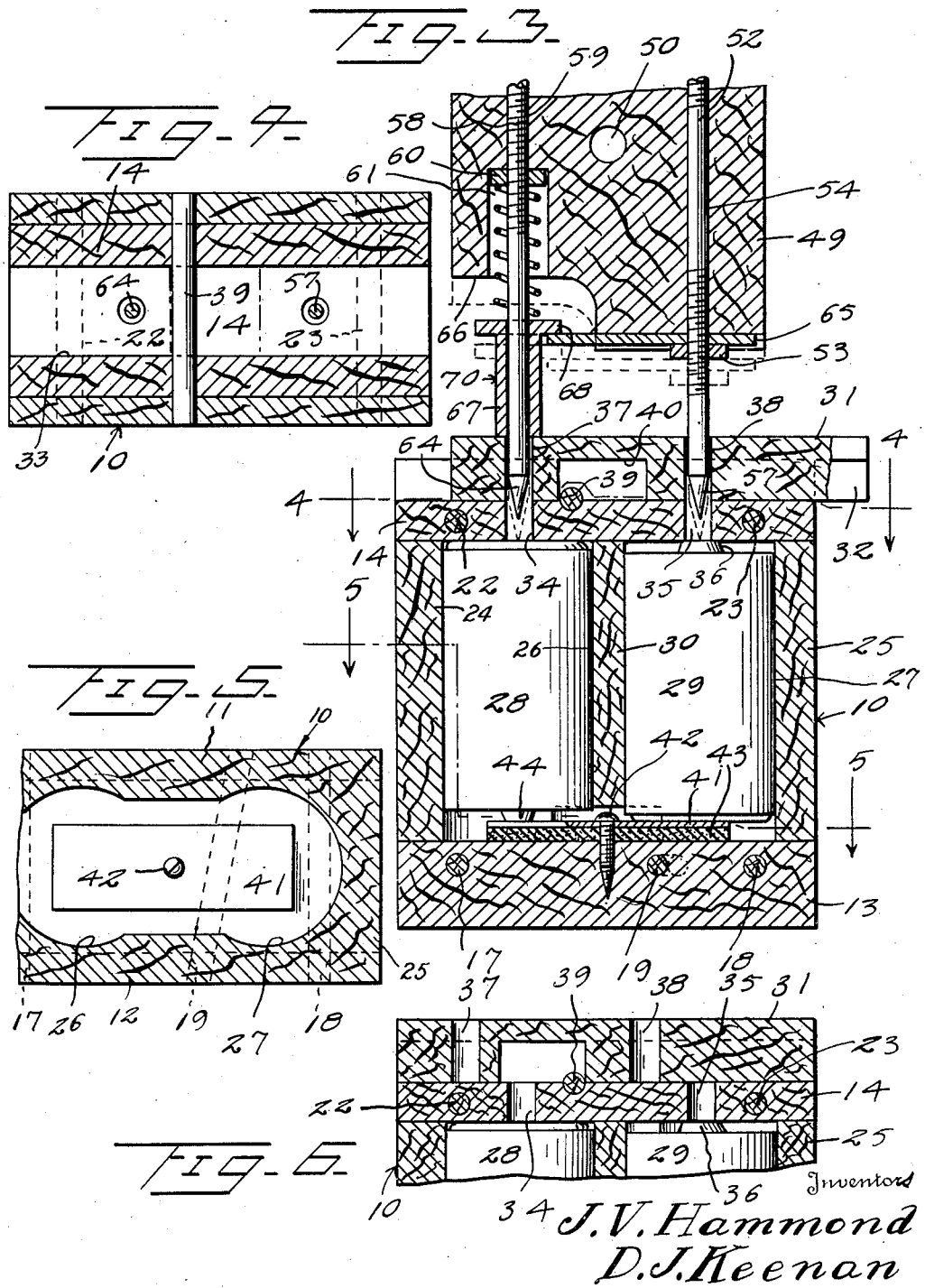

2,407,605

UNITED STATES PATENT OFFICE 2,407,605

BLASTING UNIT AND SHORT-CIRCUITING DEVICE

John V. Hammond, Spangler, and Dennis J. Keenan, Barnesboro, Pa., said Keenan assignor to said Hammond Application March 12, 1945, Serial No. 582,246

5 Claims. (Cl. 136—181)

This invention relates to a combined safety blasting battery unit and short circuiting attachment for blasting cable.

An object of this invention is to provide an improved blasting unit and cable attachment which will eliminate any accidental contact of the cable or detonator wire with the battery.

Another object of this invention is to provide a device of this kind wherein the cable attachment and battery holder or unit are so constructed that the holder or unit includes means whereby the cable upon initial insertion into the battery unit will remain shorted and the short may subsequently be broken by lateral shifting of the attachment and a portion of the holder, so as to thereby connect the battery or batteries with the cable.

A further object of this invention is to provide a combination of this kind wherein the contact between the cable attachment and the battery or batteries is formed within the battery case.

A further object of this invention is to provide a device of this kind which can be made out of wood which is moisture-proofed by means of paraffin, or other suitable coating.

A further object of this invention is to provide a device of this kind which will permit the use of standard flashlight batteries, thereby assuring ready replacement of the batteries and providing for a reduced maintenance expenditure.

To the foregoing objects and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings:

Figure 1 is a detail side elevation of a combined blasting battery unit and cable attachment constructed according to an embodiment of this invention.

Figure 2 is a sectional view taken on the line 2—2 of Figure 1.

Figure 3 is a fragmentary sectional view taken on the line 3—3 of Figure 2.

Figure 4 is a sectional view taken on the line 4—4 of Figure 3.

Figure 5 is a fragmentary sectional view taken on the line 5—5 of Figure 3.

Figure 6 is a fragmentary sectional view of the battery unit, showing the contact slide in safety position.

Referring to the drawings, the numeral 10 designates generally a battery housing which is formed of a pair of side wall members 11 and 12, a bottom wall 13 and a top wall 14. The side members 11 and 12 are provided with rabbeted lower portions 15 and 16, respectively, within which the bottom wall 13 is adapted to seat, and the bottom wall 13 is secured in the rabbeted portions 15 and 16 by means of a pair of transversely extending dowels or pins 17 and 18.

An additional locking pin 19 is extended through the side walls 11 and 12 and the bottom wall 13, being disposed at an angle as indicated in Figure 5. The opposite ends of the pins or dowels 17 and 18 are adapted to be sealed by paraffin, or other sealing means, so as to prevent the entrance of moisture within the openings engaged by these pins. The bottom wall 13 is also adapted to be sealed with respect to the side walls by a paraffin coating, or other suitable moisture proofing, which will prevent the entrance of moisture into the interior of the housing.

The top wall 14 is secured in a pair of upper rabbeted portions 20 and 21, which are formed in the upper ends of the side walls 11 and 12 by means of a pair of securing pins or dowels 22 and 23. The housing 10 also includes a pair of opposite end walls 24 and 25, which in the present instance are formed integral with the side walls 11 and 12. In practice the side and end walls of the housing are preferably formed from a block of wood, and this block is then drilled so as to form a pair of battery chambers 26 and 27 within which batteries 28 and 29 are adapted to engage. The two batteries are separated from each other by a partition or dividing wall 30 which terminates above the bottom wall 13 providing a passage between the chamber 26 and 27.

The top wall 14 has slidably mounted therein a slide member 31, which is provided with a dovetail shaped slide portion 32 engaging in a keyway 33 formed in the top wall 14. The top wall 14 is provided with a pair of openings 34 and 35 which are disposed centrally with respect to the batteries 28 and 29, respectively, the central terminal 36 of battery 29 confronting the opening 35 and being larger in diameter than this opening so that this terminal will abut against the top wall 14 in alignment with the opening 35. Battery 28 is reversed with respect to battery 29, the bottom thereof contacting the inner side of the top wall 14.

Slide member 31 is formed with a pair of openings 37 and 38, which in one position of the slide 31 are adapted to register with the openings 34 and 35. The slide 31 is limited in its movement in the keyway 33 by means of a transversely extending pin 39, which extends through at least a portion of the keyway 33 and extends into an elongated slot or cutout 40, which is formed in the inner side of the key 32. When the slide 31 is in a position with the opposite ends thereof flush with the opposite ends of the housing 10, the openings 37 and 38 in the slide will be out of registry with openings 34 and 35. The slide 31, like the housing 10, is preferably made of wood or other suitable non-conducting material.

The batteries 28 and 29 are resiliently held in contact with the top wall 14 by means of an inner bridging contact 41, which is secured to the bottom wall 13 by fastening means 42. A resilient cushioning member 43 is interposed between the bottom wall 13 and the bridging member 41 and provides an additional means whereby the bridging member 41 will be resiliently held in engagement with the lower terminal 44 of battery 28 and with the bottom or ground side of battery 29.

A blasting cable 45, which includes a pair of wires 46 and 47 disposed in a sheath 48, is adapted to be connected with the batteries 28 and 29, as will be hereinafter described. A short circuiting connector block 49, which is provided with an opening 50, is connected to the cable 45 by means of a cord or loop 51, so that when pull is exerted on cable 45, this pull will be communicated through loop or cord 51 to the block 49. The block 49 has extending therethrough an elongated contact rod 52, which is threaded for a major portion thereof, and has threaded thereon a nut 53 engaging the lower end of block 49. The rod or contact member 52 is extended through an opening 54 formed in the block 49 and a nut 55 is threaded on the upper portion of the rod 52 and holds this rod against endwise movement with respect to the block 49.

One end of wire 47 is secured about rod 52, which comprises a terminal, and is secured about the rod by means of a lock nut 56. The lower end of contact rod 52 projects below the block 49 and is provided with a conical contact point 57. The contact point 57 is adapted to be extended through opening 38 of slide 14 and may subsequently be moved downwardly when slide 31 is in registry with opening 35 in engagement with battery terminal 36.

A second contact rod 58 is mounted in an opening 59 in block 49, being firmly secured in the block 49 by means of a lower nut 60 threaded on the rod 58 and engaging in a counter bore 61 formed in block 49. An upper nut 62 is threaded on the upper end portion of rod 58 and coacts with nut 61 in holding rod 58 firmly in block 49. One end of wire 46 is disposed about contact rod 58, being secured thereabout by means of a nut 63. Contact rod 58 projects below the block 49, and is provided with a lower battery contact point 64, which is spaced from contact 57 a distance equal to the spacing between openings 37 and 38, so that point 64 may be extended through opening 37 and subsequently moved downwardly into opening 34 when slide 31 is in a position with the openings thereof registering with openings 34 and 35, so that contact point 64 may engage the bottom or ground of battery 28.

In order to provide a means whereby the contact members 52 and 58 will be normally short circuited so as to prevent any accidental closing of a circuit to wires 46 and 47, I have provided a bar 65 which is interposed between nut 53 and the lower end of block 49. Block 49 has a cutout 66 in the lower end thereof adjacent contact member 58, and a sleeve 67 is slidable on contact member 58. Sleeve 67 is formed with an annular flange 68 which is adapted to engage the adjacent end of bar 65 and a spring 69 engages about contact member 58, bearing at its upper end against nut 60 and at its lower end against slide member 70, which comprises the sleeve 67 and flange 68.

Spring 69 holds slide member 70 in normal engagement with contact bar 65, so that the two contact members 52 and 58 will be normaly short circuited.

In the use and operation of this apparatus, battery unit comprising the housing 10 is held in one hand and block 49 is held in the other hand. Normally the slide 31 is in a position with the openings 37 and 38 therein out of registry with openings 34 and 35. When it is desired to place wires 46 and 47 in circuit with batteries 28 and 29, contact members 52 and 58 are extended into openings 37 and 38, and at this time the contact points 57 and 58 will engage the bottom of the keyway 33. Slide 31 may then be moved endwise to the limit provided by the pin 39 and the slot 40, so as to bring openings 37 and 38 in registry with openings 34 and 35. Contact members 52 and 58 may then be moved inwardly to the dotted line positions shown in Figure 3, wherein contact point 57 and 64 will engage battery terminal 36 and the bottom or ground of battery 28.

At this time the lower end of sleeve 67, which is engaging with the upper side of slide 31, will move contact flange 68 out of engagement with contact bar 65, so as to break the short circuit of contact members 52 and 58.

This apparatus will provide a light weight, economical, and safe blasting unit which will eliminate any accidental connection between the blasting cable and the batteries.

The exact configuration illustrated is regarded as the optimum, but some of the desirable results inherent in this disclosure may be obtained by various slight modifications including some departure from the exact configuration shown, and it is therefore requested that the scope of the invention should be regarded as limited only by the terms of the claims.

What we claim is:

1. A blasting unit comprising a battery housing, including a top wall formed with a pair of apertures, a slide carried by said top wall having a pair of apertures adapted to register with the aperture of said top wall, a pair of batteries in said housing having terminals confronting the apertures of said end wall, and a contact member including a body member, a pair of spaced apart contact members carried by said body member engageable in the apertures of said slide and said top wall for contact with said battery terminals, and normally engaged contact shorting members engaging said contact members, said shorting members being so constructed and arranged that one of said shorting members will be moved to disengaged position with respect to the other of said shorting members when said contact members are disposed in contact with the battery terminals.

2. A blasting unit as set forth in claim 1, wherein the other one of said shorting members is fixed relative to one contact member, and said one shorting member is slidable on the other of said contact members.

3. A blasting unit as set forth in claim 1, wherein said one shorting member is slidable on a contact member, and a spring constantly urging said one shorting member into engagement with the other shorting member.

4. A blasting unit as set forth in claim 1, including a cable formed of two wires connected to said contact members, and means securing said cable to said body member, whereby pulling strain on said cable will be communicated to said body member.

5. A blasting unit comprising a battery housing, a pair of batteries in said housing, said housing having a pair of openings providing communication with said batteries, an apertured slide carried by said housing, means limiting the sliding movement of said slide, a connector element comprising a body member, a pair of spaced contact members carried by said body member projecting from said body member a distance sufficient to provide for extension of said contact members through the apertures of said slide and the openings of said housing for engagement with the terminals of said batteries, a stationary shorting member carried by one of said contact members and extending in the direction of the other contact member, a second shorting member slidably carried by the other contact member, and a spring normally holding said second shorting member in contact with said stationary contact member, said second contact member including a sleeve engageable with said slide whereby movement of said contact members through the apertures of said slide and the openings of said housing will effect breaking of the contact between said shorting members.

JOHN V. HAMMOND.
DENNIS J. KEENAN.